G. W. SCOTT.
BRACKET SUPPORT FOR VEHICLE TOPS.
APPLICATION FILED AUG. 26, 1920.

1,431,331.  Patented Oct. 10, 1922.

Inventor
George W. Scott
By Staley + Bowman
Attorneys

Patented Oct. 10, 1922.

1,431,331

UNITED STATES PATENT OFFICE.

GEORGE W. SCOTT, OF CLEVELAND, OHIO.

BRACKET SUPPORT FOR VEHICLE TOPS.

Application filed August 26, 1920. Serial No. 406,107.

*To all whom it may concern:*

Be it known that I, GEORGE W. SCOTT, a citizen of the United States, residing at Cleveland, in the county of Cuyahoga and State of Ohio, have invented certain new and useful Improvements in Bracket Supports for Vehicle Tops, of which the following is a specification.

My invention relates to improvements in brackets for connecting the forward bow of a motor vehicle top to the windshield standards for the purpose of supporting the top from the shield.

The object of my invention is to provide a bracket of this character which may be readily adjusted to the size of the windshield standard to thereby secure a snug fit between the parts to obviate rattling.

A further object of my invention is to provide a bracket of the character referred to which will be simple in construction, economical in manufacture and effective for its purpose, as well as one which may be quickly and easily adjusted to proper size and installed in position.

In the accompanying drawings:—

Figure 1:
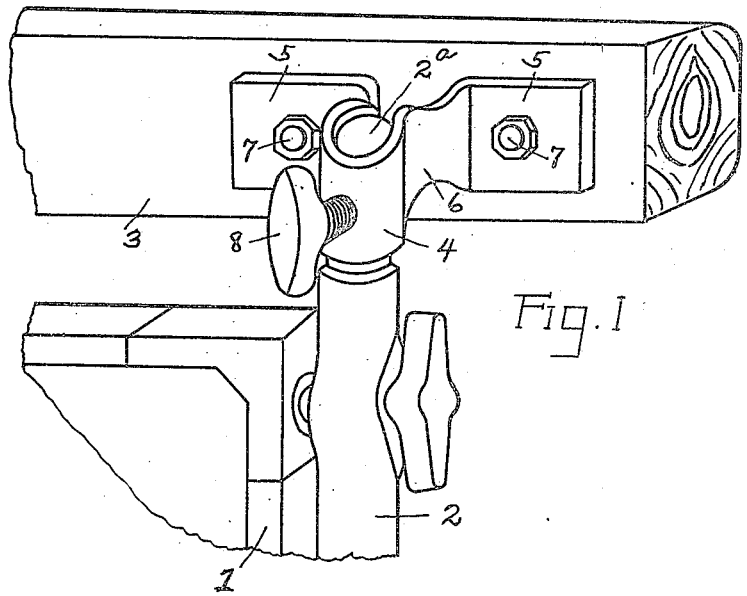
Fig. 1 is a perspective view of a portion of a windshield and top bow, showing my improved bracket applied thereto.
Figures 2, 3:
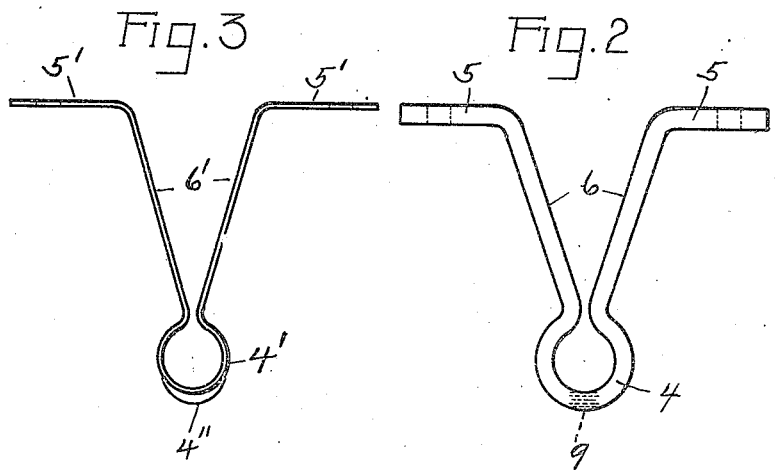
Fig. 2 is a top plan view of the bracket.
Fig. 3 is also a top plan view of a bracket formed of sheet metal.

Referring to the drawings, 1 represents a portion of a windshield and 2 a portion of one of the supporting standards therefor; a section of the vehicle bow being indicated at 3. The upper end 2ª of the supporting standard is generally reduced in size and formed circular in cross section. In Figs. 1 and 2 I have shown a bracket formed of a metal, such as malleable iron, which may be readily bent, and consisting of a sleeve portion 4, a pair of feet 5 and angularly-extending connecting portions 6. This arrangement permits the bracket to be bent by either separating the feet and connecting portions 6 or causing them to approach each other to enlarge or reduce the size of the sleeve 4 in order that the sleeve 4 will closely hug the reduced portion 2ª of the standard. It might be explained that the upper end of these standards vary in diameter on different makes of windshields and it is, therefore, impossible to fit the bracket, as heretofore constructed, thereto in a satisfactory way.

The feet are connected to the top bow by bolts 7, and the set-screw 8, threaded in an aperture 9 in the sleeve, is preferably provided to force the standard in close contact with the walls of the sleeve.

In Fig. 3 the bracket is shown as constructed of sheet metal, 4' representing the sleeve portion, 5' the feet and 6' the intermediate connecting portions. In stamping out such a bracket a boss 4'' is formed on the sleeve and threaded to receive the set-screw. Such a sheet metal bracket is generally the preferable form as it is more cheaply constructed.

Having thus described my invention, I claim:—

The combination with a windshield standard and the bow of a vehicle top, of a bracket formed of an integral piece of bendable metal and consisting of a sleeve portion, a pair of feet and angularly-extending connecting portions between said sleeve and feet, said sleeve being of uniform diameter throughout its length, said angularly-extending portions being spaced apart at the point where they join the sleeve portion to permit the sleeve portion to be contracted, and a set screw arranged in the wall of said sleeve portion.

In testimony whereof, I have hereunto set my hand this 21st day of August, 1920.

GEORGE W. SCOTT.

Witnesses:
H. D. LOGAN,
F. F. VAN DEUSEN.